US012455329B2

United States Patent
Tong et al.

(10) Patent No.: US 12,455,329 B2
(45) Date of Patent: Oct. 28, 2025

(54) MRI SYSTEM AND RF COIL ASSEMBLY THEREOF

(71) Applicant: Siemens Healthcare GmbH, Erlangen (DE)

(72) Inventors: Tong Tong, Shenzhen (CN); Bing Wu Zhang, Shenzhen (CN); Zheng He He, Shenzhen (CN)

(73) Assignee: Siemens Healthineers AG, Erlangen (DE)

( * ) Notice: Subject to any disclaimer, the term of this patent is extended or adjusted under 35 U.S.C. 154(b) by 16 days.

(21) Appl. No.: 18/216,018

(22) Filed: Jun. 29, 2023

(65) Prior Publication Data
US 2024/0004006 A1    Jan. 4, 2024

(30) Foreign Application Priority Data
Jun. 29, 2022 (CN) .......................... 202210749647.9

(51) Int. Cl.
G01R 33/34 (2006.01)
G01R 33/36 (2006.01)

(52) U.S. Cl.
CPC . *G01R 33/34084* (2013.01); *G01R 33/34007* (2013.01); *G01R 33/3628* (2013.01)

(58) Field of Classification Search
CPC ........ G01R 33/34084; G01R 33/34007; G01R 33/3628; G01R 33/3415; G01R 33/36; A61B 5/055; A61B 5/0042; A61B 5/702; A61B 5/704
See application file for complete search history.

(56) References Cited

U.S. PATENT DOCUMENTS

| 5,307,806 A * | 5/1994 | Jones ............... G01R 33/34061 |
| | | 324/318 |
| 5,390,672 A * | 2/1995 | Jones ..................... G01R 33/34 |
| | | 324/318 |
| 5,517,120 A * | 5/1996 | Misic ............... G01R 33/34046 |
| | | 324/318 |
| 2014/0148686 A1* | 5/2014 | Thevathasan .......... A61B 5/055 |
| | | 600/415 |

* cited by examiner

*Primary Examiner* — G. M. A Hyder
(74) *Attorney, Agent, or Firm* — Banner & Witcoff Ltd.

(57) ABSTRACT

An RF coil assembly for an MRI system may include a coil support and an RF coil. The coil support may include a base, a first adjusting arm and a second adjusting arm. The first adjusting arm is rotatably connected to the base and rotatable about a first axis relative to the base. The second adjusting arm is rotatably connected to the first adjusting arm and rotatable about a second axis relative to the first adjusting arm, the second axis being parallel to the first axis. The RF coil is rotatably connected to the second adjusting arm and rotatable about a third axis relative to the second adjusting arm, the third axis being parallel to the first axis. The position and angle of the RF coil can be flexibly adjusted so that the RF coil fits the examination subject more closely, thus helping to increase imaging quality.

19 Claims, 12 Drawing Sheets

MRI SYSTEM AND RF COIL ASSEMBLY THEREOF

CROSS REFERENCE TO RELATED APPLICATIONS

This patent application claims priority to Chinese Patent Application No. 202210749647.9, filed Jun. 29, 2022, which is incorporated herein by reference in its entirety.

BACKGROUND

Field

The present disclosure relates to the field of medical equipment, in particular to an RF coil assembly for an MRI system.

Related Art

An RF coil is one of the core components of a magnetic resonance imaging (MRI) system, capable of receiving magnetic resonance signals of an examination subject. During use, the RF coil should fit the examination subject as closely as possible, to increase the intensity of magnetic resonance signals received and reduce the noise received. At present, the position and angle of most RF coils cannot be adjusted flexibly to suit different examination subjects during use.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 11:
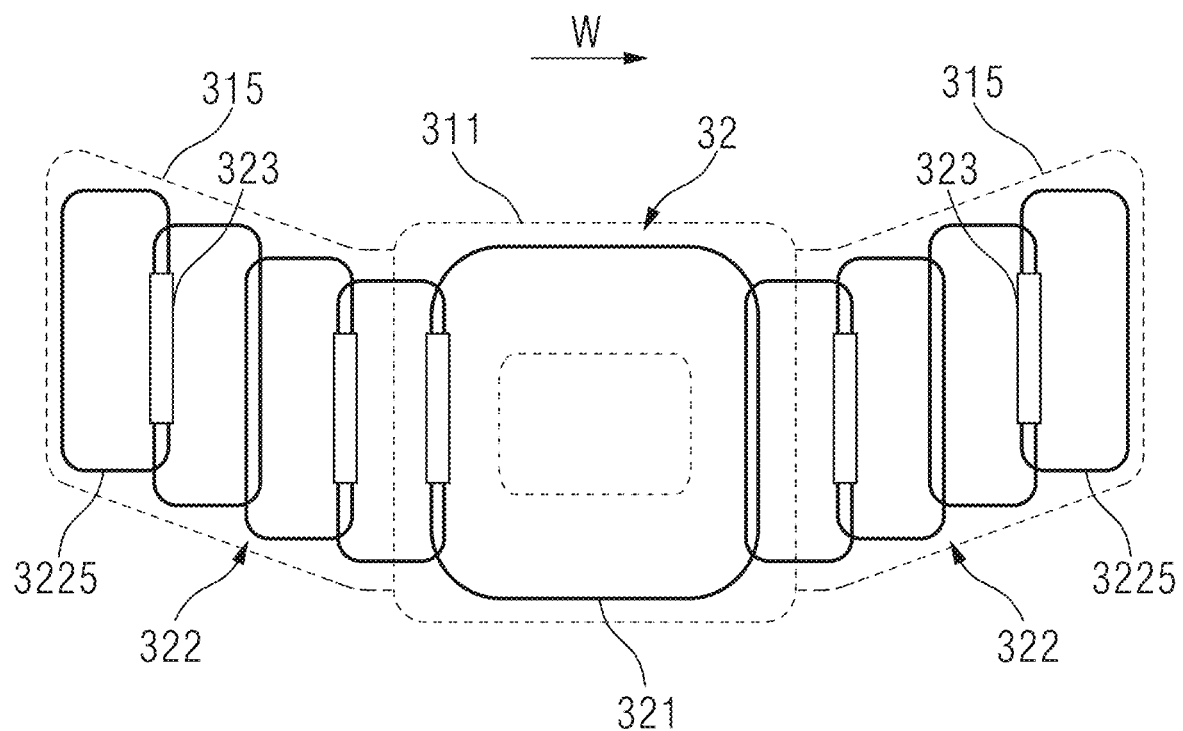

FIG. 11 a coil set of the RF coil according to an exemplary embodiment of the disclosure.

Figure 1:
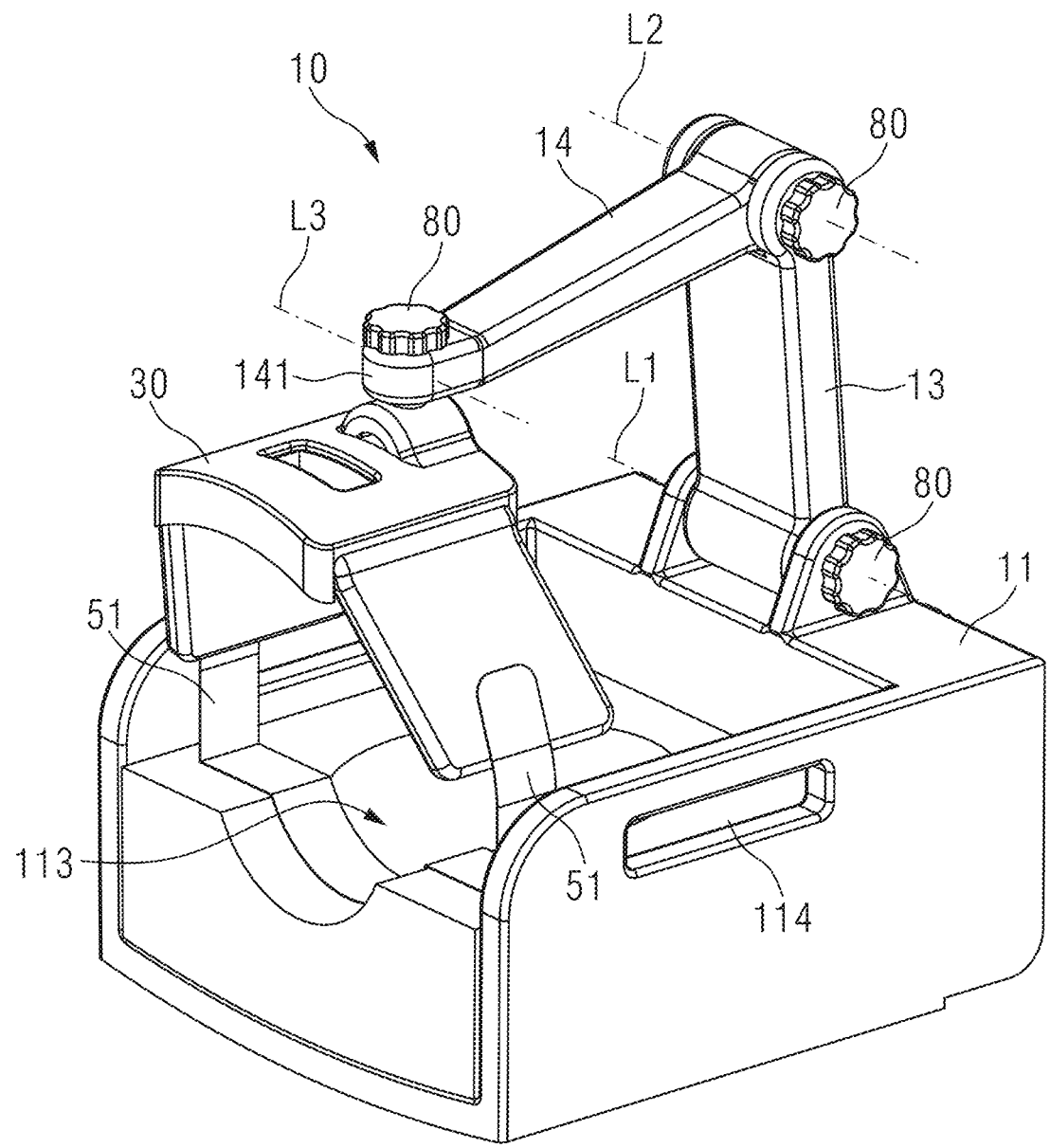
FIG. 1 is an RF coil assembly for an MRI system according to an exemplary embodiment of the disclosure.
Figure 12:
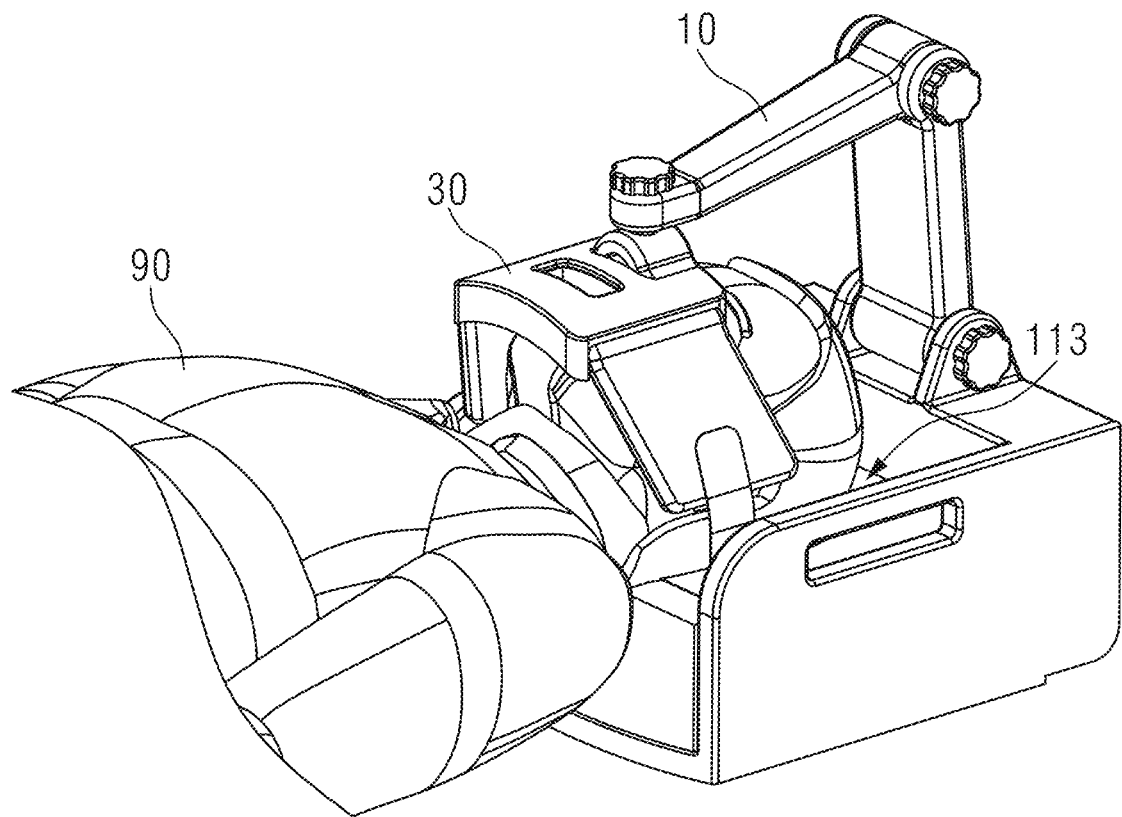

FIG. 12 shows the RF coil assembly shown in FIG. 1, according to an exemplary embodiment of the disclosure.

The exemplary embodiments of the present disclosure will be described with reference to the accompanying drawings. Elements, features and components that are identical, functionally identical and have the same effect are—insofar as is not stated otherwise—respectively provided with the same reference character. To make the drawings appear uncluttered, only those parts relevant to the present disclosure are shown schematically in the drawings; they do not represent the actual structure thereof as a product.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An objective of the present disclosure is to provide an RF coil assembly for an MRI system, in which the position and angle of an RF coil are flexibly adjustable so that the RF coil fits the examination subject more closely.

Another objective of the present disclosure is to provide an MRI system, which can flexibly adjust the position and angle of an RF coil so that the RF coil fits the examination subject more closely.

The present disclosure provides an RF coil assembly for an MRI system, comprising a coil support and an RF coil. The coil support comprises a base, a first adjusting arm and a second adjusting arm. The first adjusting arm is rotatably connected to the base, so as to be rotatable about a first axis relative to the base. The second adjusting arm is rotatably connected to the first adjusting arm, so as to be rotatable about a second axis relative to the first adjusting arm, the second axis being parallel to the first axis. The RF coil is rotatably connected to the second adjusting arm, so as to be rotatable about a third axis relative to the second adjusting arm, the third axis being parallel to the first axis. The first axis, second axis and third axis are configured to be separate. The RF coil is used to receive magnetic resonance signals.

In the RF coil assembly for an MRI system, the position and angle of the RF coil can be flexibly adjusted so that the RF coil fits the examination subject more closely, thus helping to increase imaging quality.

In another exemplary embodiment of the RF coil assembly for an MRI system, the RF coil is rotatably connected to the second adjusting arm by means of a spherical pair. This enables the angle of the RF coil to be adjusted more flexibly.

In another exemplary embodiment of the RF coil assembly for an MRI system, the RF coil has a ball head. The second adjusting arm has a coil connecting part. The ball head is rotatably embedded in the coil connecting part so as to form a spherical pair with the coil connecting part. The coil support further comprises a braking member. The braking member is thread-connected to the coil connecting part and able to advance helically in an axial direction of a thread thereof until the braking member presses against the ball head, in order to increase the rotation resistance of the ball head. The braking member enables the rotational position of the RF coil relative to the second adjusting arm to be fixed conveniently.

In another exemplary embodiment of the RF coil assembly for an MRI system, the coil support further comprises a first connecting shaft. The base has a first shaft seat and a second shaft seat arranged opposite one another along the first axis. The first connecting shaft has a first pressing part and a first rotation shaft part arranged consecutively along the first axis. The first pressing part is thread-connected to the first shaft seat around the first axis. The first rotation shaft part is a cylinder with its axis coinciding with the first axis and has one end connected to the second shaft seat. The first adjusting arm is fitted round the first rotation shaft part rotatably. The first pressing part has a first abutment face facing the first adjusting arm. The first abutment face is able to press against the first adjusting arm in a direction parallel to the first axis and facing toward the second shaft seat, in order to increase the rotation resistance of the first adjusting arm. In this way, the relative rotational positions of the base and the first adjusting arm can be conveniently fixed.

In another exemplary embodiment of the RF coil assembly for an MRI system, the coil support further comprises a second connecting shaft. The first adjusting arm has a third shaft seat and a fourth shaft seat arranged opposite one another along the second axis. The second connecting shaft has a second pressing part and a second rotation shaft part arranged consecutively along the second axis. The second pressing part is thread-connected to the third shaft seat around the second axis. The second rotation shaft part is a cylinder with its axis coinciding with the second axis and has one end connected to the fourth shaft seat. The second adjusting arm is fitted round the second rotation shaft part rotatably. The second pressing part has a second abutment face facing the second adjusting arm. The second abutment face is able to press against the second adjusting arm in a direction parallel to the second axis and facing toward the fourth shaft seat, in order to increase the rotation resistance of the second adjusting arm. In this way, the relative rotational positions of the first adjusting arm and the second adjusting arm can be conveniently fixed.

In another exemplary embodiment of the RF coil assembly for an MRI system, the RF coil comprises a main body and a coil set. The main body comprises a support part and two extension parts. The support part is rotatably connected to the second adjusting arm. The two extension parts are respectively connected to two ends of the support part in a width direction of the support part. The coil set is concealed within the main body and disposed at the support part and the two extension parts. The coil set is used to receive magnetic resonance signals. The hard support part can be substantially free of deformation during use, and is thus beneficial for supporting and positioning the coil set. The soft extension parts can deform appropriately during use according to the examination subject's profile, so that the coil set fits the examination subject more closely, and are thus beneficial for increasing the imaging signal-to-noise ratio.

In another exemplary embodiment of the RF coil assembly for an MRI system, the RF coil assembly further comprises two soft fixing belts and two hook-and-loop fasteners. Each fixing belt has one end connected to the base. The other end of each fixing belt is connected to one of the extension parts via one of the hook-and-loop fasteners. The relative positions of the fixing belt and the extension part after connection are adjustable by means of the hook-and-loop fastener. This enables the degree of deformation of the extension part to be adjusted conveniently, in order to adapt to different examination subjects.

In another exemplary embodiment of the RF coil assembly for an MRI system, the RF coil is used to receive magnetic resonance signals emitted by tissue and organs in an oral cavity region of an examination subject. The coil set comprises a central coil unit and two lateral coil unit sets. The central coil unit is disposed at the support part and used to receive magnetic resonance signals from a mouth/nose side. The support part has a central vent hole for mouth and nose ventilation. The central coil unit is arranged around the central vent hole. The two lateral coil unit sets are respectively disposed at two sides of the central coil unit in the width direction of the support part and respectively used to receive magnetic resonance signals from two cheek sides. Each lateral coil unit set is disposed at one end of the support part in the width direction and the extension part connected to this end. Each lateral coil unit set comprises multiple side coil units arranged sequentially in such a way as to gradually move away from the central coil unit. The imaging quality for the oral cavity region can be improved by providing a central coil unit and lateral coil unit sets for the oral cavity structure.

In another exemplary embodiment of the RF coil assembly for an MRI system, the RF coil is used to receive magnetic resonance signals emitted by tissue and organs in an oral cavity region of an examination subject. The coil set comprises two central coil units and two lateral coil unit sets. The two central coil units are disposed at the support part and used to receive magnetic resonance signals from a mouth/nose side. The support part has a first vent hole for mouth ventilation and a second vent hole for nose ventilation. One of the central coil units is arranged around the first vent hole, and the other central coil unit is arranged around the second vent hole. The two lateral coil unit sets are respectively disposed at two sides of the central coil units in the width direction of the support part and respectively used to receive magnetic resonance signals from two cheek sides. Each lateral coil unit set is disposed at one end of the support part in the width direction and the extension part connected to this end. Each lateral coil unit set comprises multiple side coil units arranged sequentially in such a way as to gradually move away from the central coil unit. The imaging quality for the oral cavity region can be improved by providing a central coil unit and lateral coil unit sets for the oral cavity structure. Compared with providing a single central coil unit, providing two central coil units at the mouth/nose side can help to further improve the imaging quality.

In another exemplary embodiment of the RF coil assembly for an MRI system, the multiple side coil units of each lateral coil unit set are arranged to correspond to a distribution region of teeth and a temporomandibular joint. This helps to improve imaging quality for the teeth and temporomandibular joint.

In another exemplary embodiment of the RF coil assembly for an MRI system, adjacent parts of all adjacent pairs of the central coil unit and the side coil units of the coil set are arranged to overlap, in order to achieve decoupling.

In another exemplary embodiment of the RF coil assembly for an MRI system, the coil set further comprises multiple printed circuit boards (PCBs). A tuning/detuning circuit of the central coil unit and tuning/detuning circuits of the side coil units are disposed on the PCB.

This helps to increase circuit reliability.

In another exemplary embodiment of the RF coil assembly for an MRI system, the RF coil assembly further comprises a connecting plug, a low-noise amplifier assembly and a connecting cable. The connecting plug is disposed on the base. The low-noise amplifier assembly is disposed in the base and connected to the connecting plug. The connecting cable has one end connected to the low-noise amplifier assembly and another end connected to the RF coil. The connecting cable is concealed in the coil support and sequentially passes through the base, the first adjusting arm and the second adjusting arm. It is thus possible to avoid interference to the examination subject from an external cable, and the high degree of integration can facilitate use.

In another exemplary embodiment of the RF coil assembly for an MRI system, the base has an accommodating recess for accommodating the examination subject's head; this can help to stabilize the position and angle of the examination subject's head during examination.

In another exemplary embodiment of the RF coil assembly for an MRI system, the base also has two handle holes, to make it easier to move the RF coil assembly.

The present disclosure also provides an MRI system, comprising the RF coil assembly described above. In the RF coil assembly for an MRI system, the position and angle of the RF coil can be flexibly adjusted so that the RF coil fits the examination subject more closely, thus helping to increase imaging quality.

Figure 2:
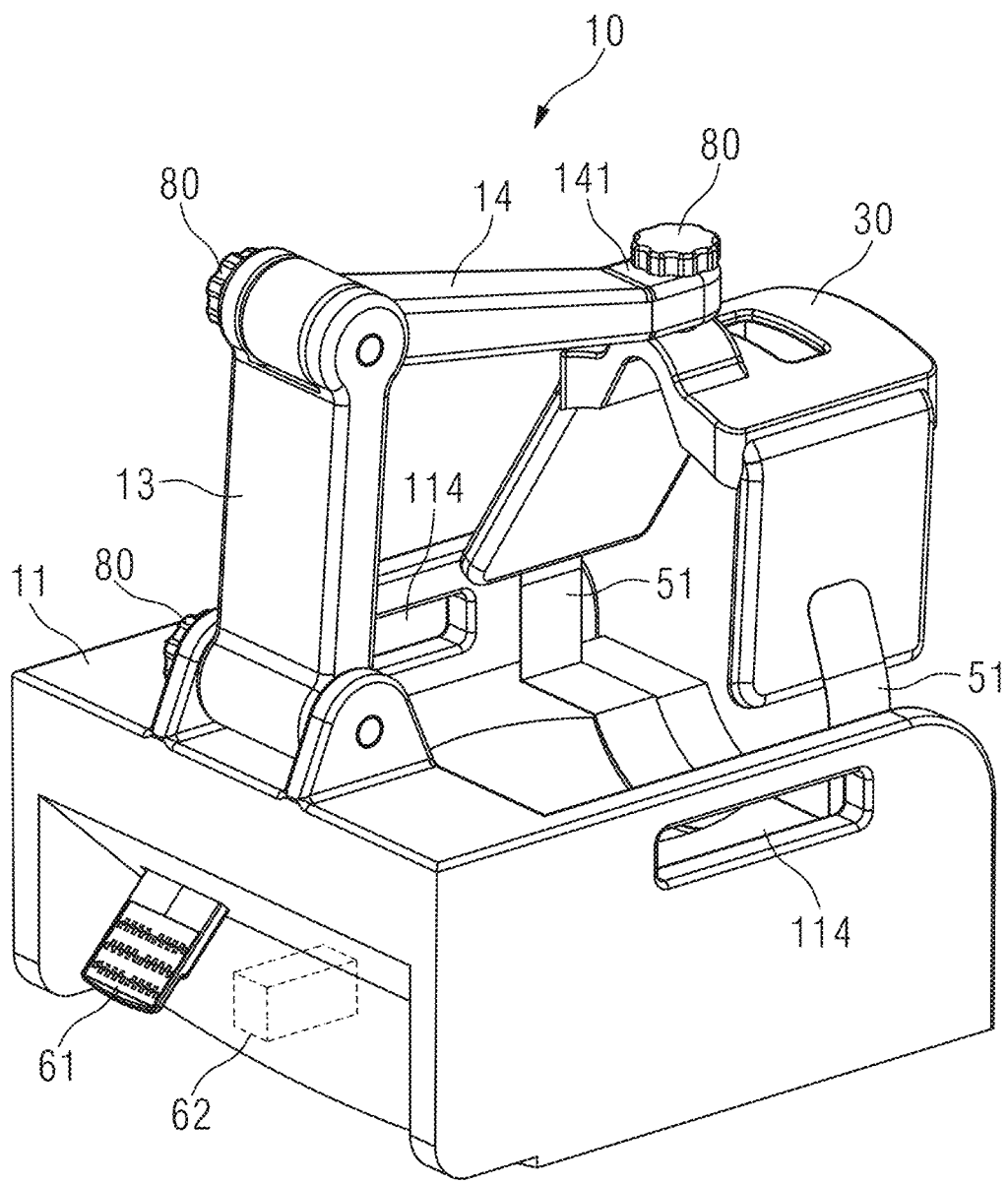
FIG. 2 is the RF coil assembly shown in FIG. 1, viewed from a different angle.

FIG. 1 is a 3D structural schematic drawing of an exemplary embodiment of an RF coil assembly for an MRI system. FIG. 2 is a 3D structural schematic drawing of the RF coil assembly shown in FIG. 1, viewed from a different angle. As shown in FIGS. 1 and 2, the RF coil assembly for the MRI system comprises a coil support 10 and an RF coil 30. The RF coil is used to receive magnetic resonance signals. The RF coil 30 is for example an oral cavity coil or a carotid artery coil, the oral cavity coil being used to receive magnetic resonance signals emitted by tissue and organs in the oral cavity region of the examination subject, and the carotid artery coil being used to receive magnetic resonance signals emitted by the carotid artery, but there is no restriction to this. In this exemplary embodiment, the oral cavity coil is taken as an example to provide a detailed explanation.

The coil support 10 comprises a base 11, a first adjusting arm 13 and a second adjusting arm 14. The first adjusting arm 13 is rotatably connected to the base 11, so as to be rotatable about a first axis L1 relative to the base 11. The second adjusting arm 14 is rotatably connected to the first adjusting arm 13, so as to be rotatable about a second axis L2 relative to the first adjusting arm 13, the second axis being parallel to the first axis L1. The RF coil 30 is rotatably connected to the second adjusting arm 14, so as to be rotatable about a third axis L3 relative to the second adjusting arm 14, the third axis being parallel to the first axis L1. The first axis L1, second axis L2 and third axis L3 are configured to be separate. Thus, the position and angle of the RF coil 30 can be adjusted flexibly by rotating the first adjusting arm 13, the second adjusting arm 14 and the RF coil 30.

In the RF coil assembly for an MRI system, the position and angle of the RF coil can be flexibly adjusted so that the RF coil fits the examination subject more closely, thus helping to increase imaging quality.

In an exemplary embodiment, the RF coil 30 is rotatably connected to the second adjusting arm 14 by means of a spherical pair. Thus, in addition to being rotatable about the third axis L3 relative to the second adjusting arm 14, the RF coil 30 is also rotatable about other axes of the spherical centre of the spherical pair relative to the second adjusting arm 14, so the angle of the RF coil 30 can be adjusted more flexibly.

Figure 3:
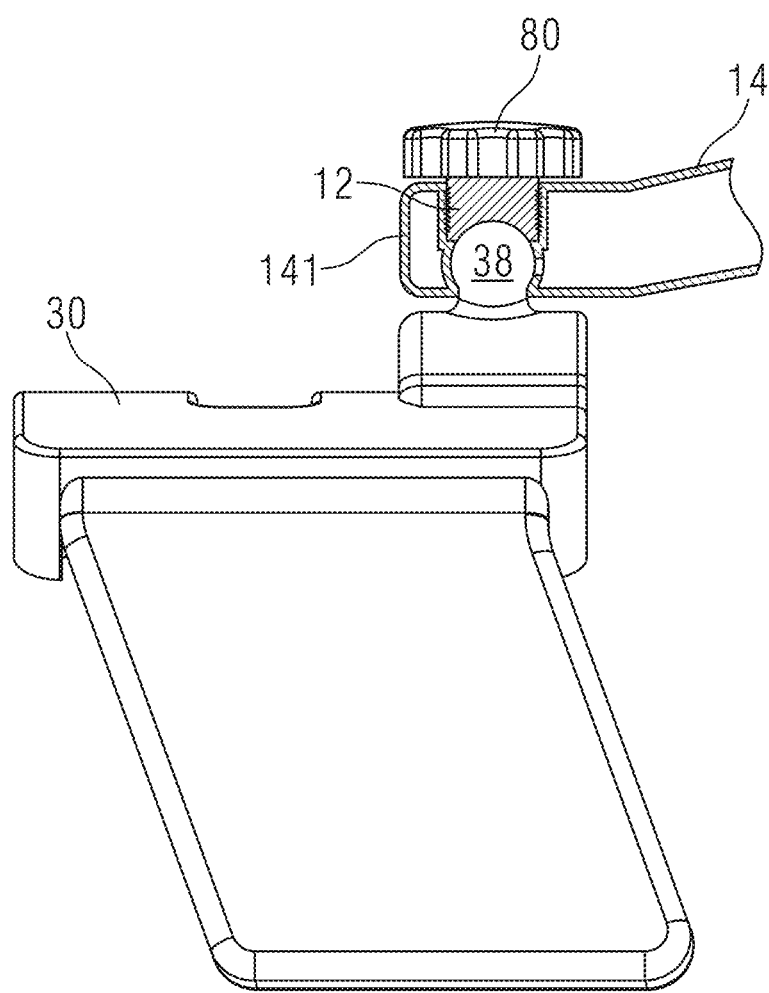
FIG. 3 is a partial sectional view of part of the structure of the RF coil assembly shown in FIG. 1.

FIG. 3 is a partial sectional view of part of the structure of the RF coil assembly shown in FIG. 1. Specifically, as shown in FIG. 3, in this exemplary embodiment, the RF coil 30 has a ball head 38. The second adjusting arm 14 has a coil connecting part 141. The ball head 38 is rotatably embedded in the coil connecting part 141, so as to form the spherical pair with the coil connecting part 141. In other exemplary embodiments, it is also possible for a ball head to be fixed to the second adjusting arm 14 and rotatably embedded in the RF coil 30. In other exemplary embodiments, the RF coil 30 may also for example be rotatably connected to the second adjusting arm 14 by means of a revolute pair.

As shown in FIG. 3, in an exemplary embodiment, the coil support 10 further comprises a braking member 12. The braking member 12 is thread-connected to the coil connecting part 141, and is able to advance helically in an axial direction of a thread thereof (i.e. the vertically downward direction in FIG. 3) until the braking member presses against the ball head 38, in order to increase the rotation resistance of the ball head 38. During use, as shown in FIG. 3, if the braking member 12 is twisted so that it moves upward and detaches from the ball head 38, the rotational position of the RF coil 30 relative to the second adjusting arm 14 can be adjusted; and the rotational position of the RF coil 30 relative to the second adjusting arm 14 can be fixed by twisting the braking member 12 so that it moves downward and presses against the ball head 38.

Figure 4:
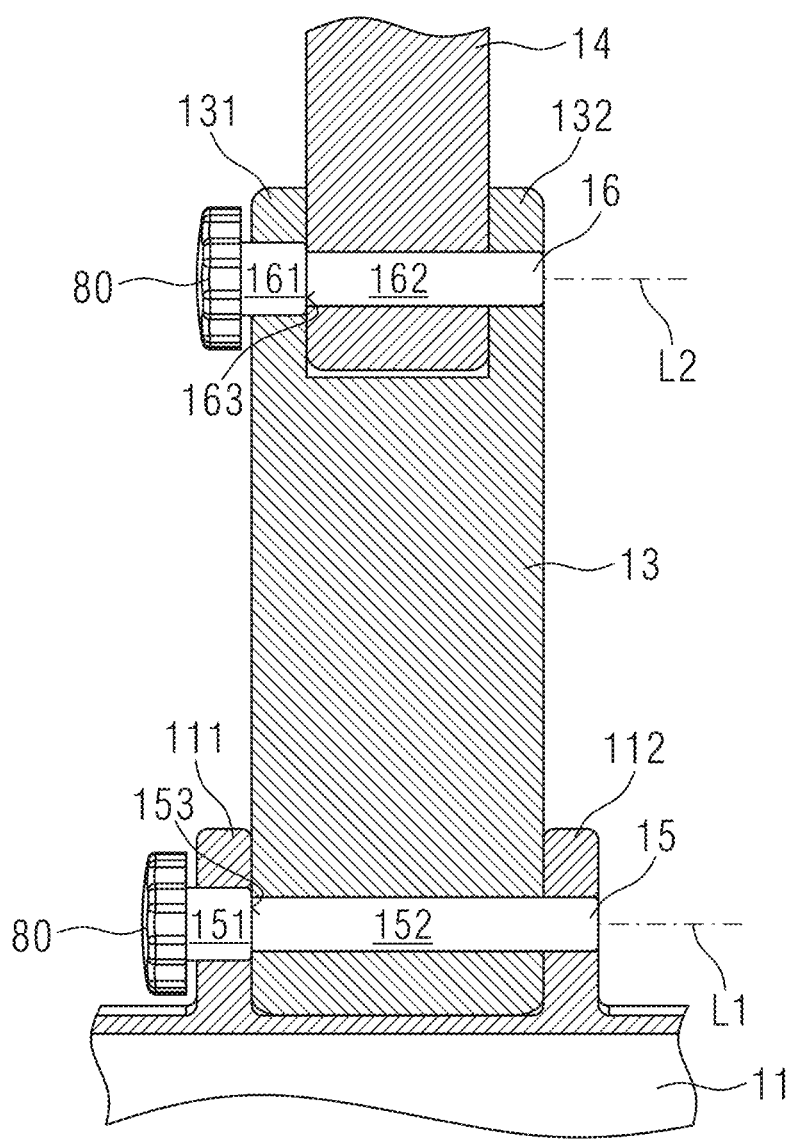
FIG. 4 is a partial sectional view of part of the structure of the RF coil assembly shown in FIG. 1.

FIG. 4 is a partial sectional view of part of the structure of the RF coil assembly shown in FIG. 1. As shown in FIG. 4, in an exemplary embodiment, the coil support 10 further comprises a first connecting shaft 15. The base 11 has a first shaft seat 111 and a second shaft seat 112, arranged opposite one another along the first axis L1. The first connecting shaft 15 has a first pressing part 151 and a first rotation shaft part 152, arranged consecutively along the first axis L1. The first pressing part 151 is thread-connected to the first shaft seat 111 around the first axis L1. The first rotation shaft part 152 is a cylinder with its axis coinciding with the first axis L1, and has one end connected to the second shaft seat 112. The first adjusting arm 13 is fitted round the first rotation shaft part 152 rotatably. The first pressing part 151 has a first abutment face 153 facing the first adjusting arm 13. The first abutment face 153 can press against the first adjusting arm 13 in a direction parallel to the first axis L1 and facing toward the second shaft seat 112, in order to increase the rotation resistance of the first adjusting arm 13. During use, as shown in FIG. 4, the relative positions of the first abutment face 153 and the second shaft seat 112 can be adjusted by twisting the first connecting shaft 15, in order to clamp or release the first adjusting arm 13. In this way, the relative rotational positions of the base 11 and the first adjusting arm 13 can be conveniently fixed.

As shown in FIG. 4, in an exemplary embodiment, the coil support 10 further comprises a second connecting shaft 16. The first adjusting arm 13 has a third shaft seat 131 and a fourth shaft seat 132, arranged opposite one another along the second axis L2. The second connecting shaft 16 has a second pressing part 161 and a second rotation shaft part 162, arranged consecutively along the second axis L2. The second pressing part 161 is thread-connected to the third shaft seat 131 around the second axis L2. The second rotation shaft part 162 is a cylinder with its axis coinciding with the second axis L2, and has one end connected to the fourth shaft seat 132. The second adjusting arm 14 is fitted round the second rotation shaft part 162 rotatably. The second pressing part 161 has a second abutment face 163 facing the second adjusting arm 14. The second abutment face 163 can press against the second adjusting arm 14 in a direction parallel to the second axis L2 and facing toward the fourth shaft seat 132, in order to increase the rotation resistance of the second adjusting arm 14. During use, as shown in FIG. 4, the relative positions of the second abutment face 163 and the fourth shaft seat 132 can be adjusted by twisting the second connecting shaft 16, in order to clamp or release the second adjusting arm 14. In this way, the relative rotational positions of the first adjusting arm 13 and the second adjusting arm 14 can be conveniently fixed.

Figure 5:
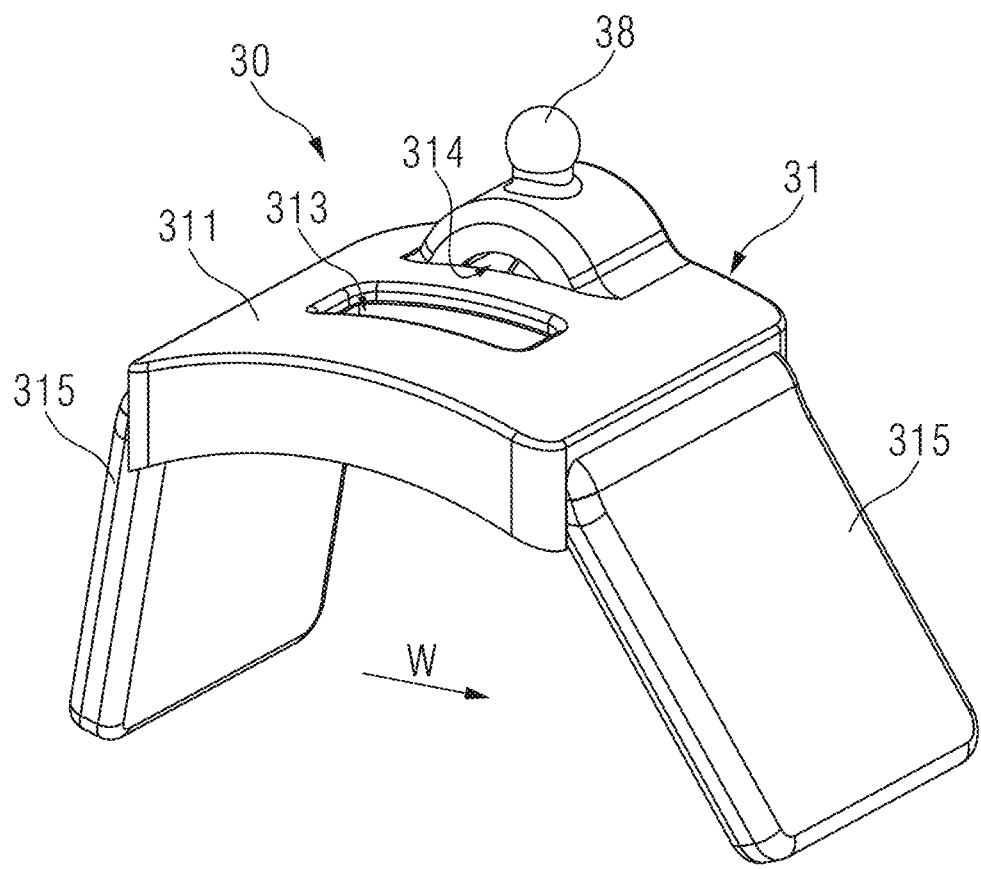
FIG. 5 is a structural schematic drawing of the RF coil of the RF coil assembly shown in FIG. 1.

FIG. 5 is a structural schematic drawing of the RF coil of the RF coil assembly shown in FIG. 1. As shown in FIG. 5, in an exemplary embodiment, the RF coil 30 comprises a main body 31, and a coil set 32 concealed within the main body 31 (the coil set is not shown in FIG. 5). The main body 31 comprises a hard support part 311 and two soft extension parts 315. The support part 311 is rotatably connected to the second adjusting arm 14; specifically, in this exemplary embodiment, the support part 311 is connected via the ball head 38 fixed thereon to the second adjusting arm 14 rotatably. The two extension parts 315 are respectively connected to two ends of the support part 311 in a width direction W of the support part 311. When the RF coil assembly is being used, the width direction W of the support part 311 is for example intended to be substantially perpendicular to the sagittal plane of the examination subject's head. The coil set 32 is disposed at the support part 311 and the two extension parts 315, and used to receive magnetic resonance signals. The hard support part 311 can be substantially free of deformation during use, and is thus beneficial for supporting and positioning the coil set 32. The soft extension parts 315 can deform appropriately during use according to the examination subject's profile, so that the coil set 32 fits the examination subject more closely, and are thus beneficial for increasing the imaging signal-to-noise ratio. The extension parts 315 are for example made of a soft foamed material.

Figure 6:
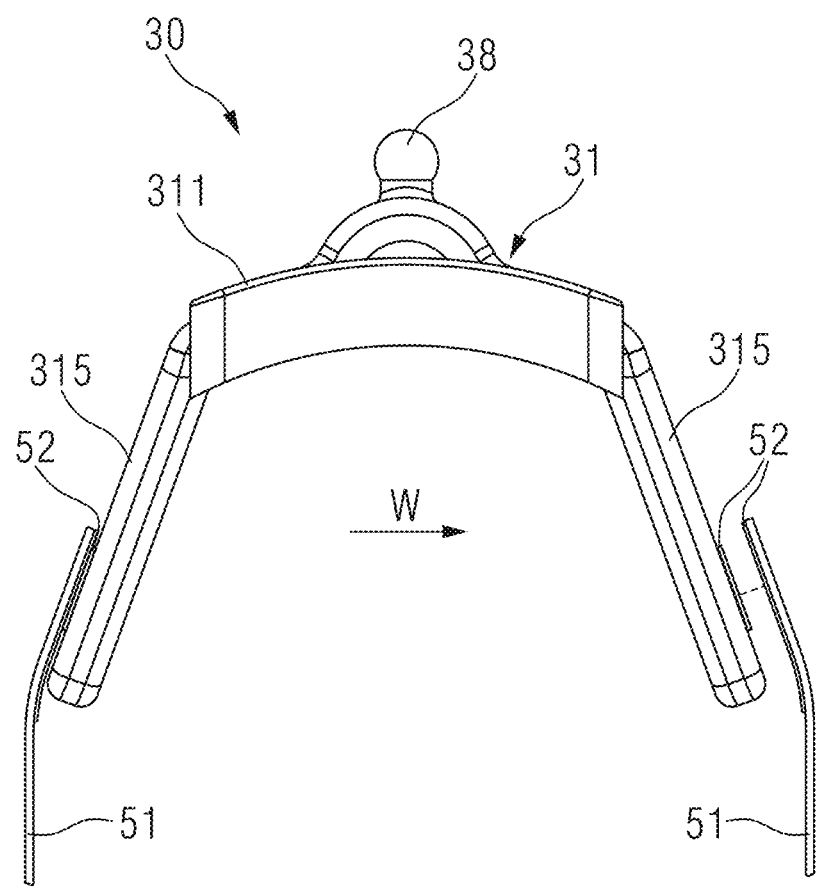
FIG. 6 shows the connection relationship of the RF coil, the fixing belts, and the hook-and-loop fasteners of the RF coil assembly shown in FIG. 1, according to an exemplary embodiment of the disclosure.

As shown in FIGS. 1 and 2, in an exemplary embodiment, the RF coil assembly further comprises two soft fixing belts 51 and two hook-and-loop fasteners 52 (the hook-and-loop fasteners are not shown in FIGS. 1 and 2). One end of each fixing belt 51 is connected to the base 11. The other end of each fixing belt 51 is connected to one extension part 315 by means of one hook-and-loop fastener 52. FIG. 6 shows the connection relationship of the RF coil 30, the fixing belts 51 and the hook-and-loop fasteners 52. Since the relative fixing positions of the hook face and loop face of the hook-and-loop fastener 52 are adjustable, the relative positions of the fixing belt 51 and the extension part 315 after connection can be adjusted, and the degree of deformation of the extension part 315 can thus be adjusted conveniently, in order to adapt to different examination subjects. In an exemplary embodiment, the two fixing belts 51 may be separate, or may be two parts of one complete belt.

Figure 7:
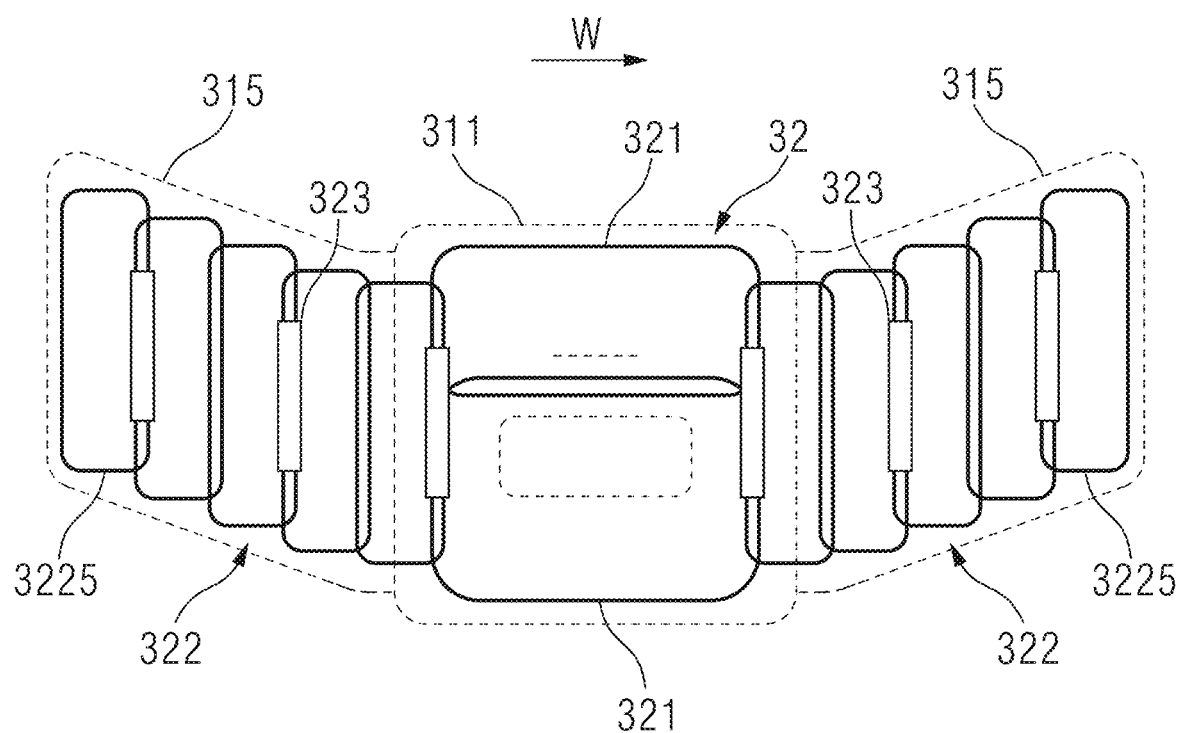
FIG. 7 shows the coil set of the RF coil of the RF coil assembly shown in FIG. 1, according to an exemplary embodiment of the disclosure.
Figure 8:
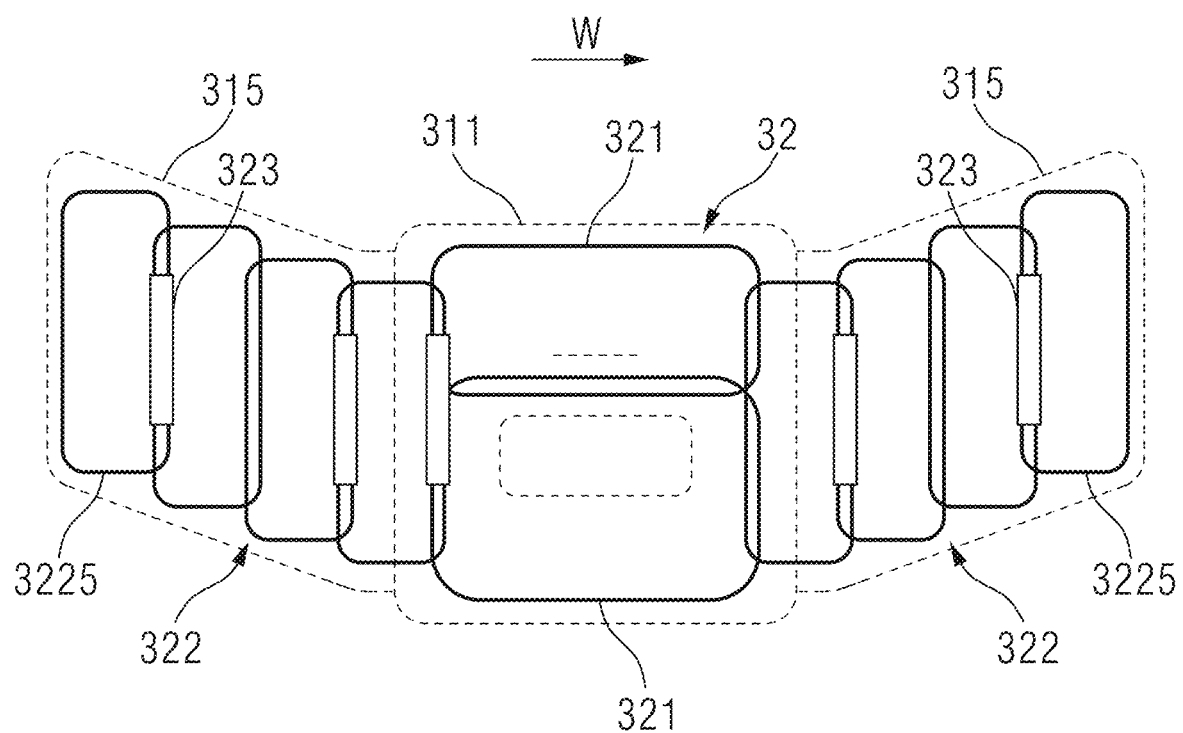
FIG. 8 shows a coil set of the RF coil according to an exemplary embodiment of the disclosure.

FIG. 7 is a structural schematic drawing of the coil set of the RF coil of the RF coil assembly shown in FIG. 1, showing the state of the coil set when laid flat. As shown in FIG. 7, in an exemplary embodiment, the coil set 32 comprises two central coil units 321 and two lateral coil unit sets 322. The two central coil units 321 are disposed at the support part 311 and used to receive magnetic resonance signals from the mouth/nose side. As shown in FIG. 5, the support part 311 has a first vent hole 313 for mouth ventilation and a second vent hole 314 for nose ventilation. One of the central coil units 321 is arranged around the first vent hole 313, and the other central coil unit 321 is arranged around the second vent hole 314. The two lateral coil unit sets 322 are respectively arranged at two sides of the central coil units 321 in the width direction W of the support part 311, and used to receive magnetic resonance signals from the two cheek sides respectively. Each lateral coil unit set 322 is arranged at one end of the support part 311 in the width direction W and the extension part 315 connected to this end. Each lateral coil unit set 322 comprises five side coil units 3225, arranged sequentially in such a way as to gradually move away from the central coil units 321 (only one side coil unit of each lateral coil unit set is labelled schematically in the figure). In other exemplary embodiments, the number of side coil units 3225 may be adjusted as required; FIG. 8 shows schematically the case where each lateral coil unit set 322 comprises four side coil units 3225. The imaging quality for the oral cavity region can be improved by providing a central coil unit and lateral coil unit sets for the oral cavity structure.

Figure 9:
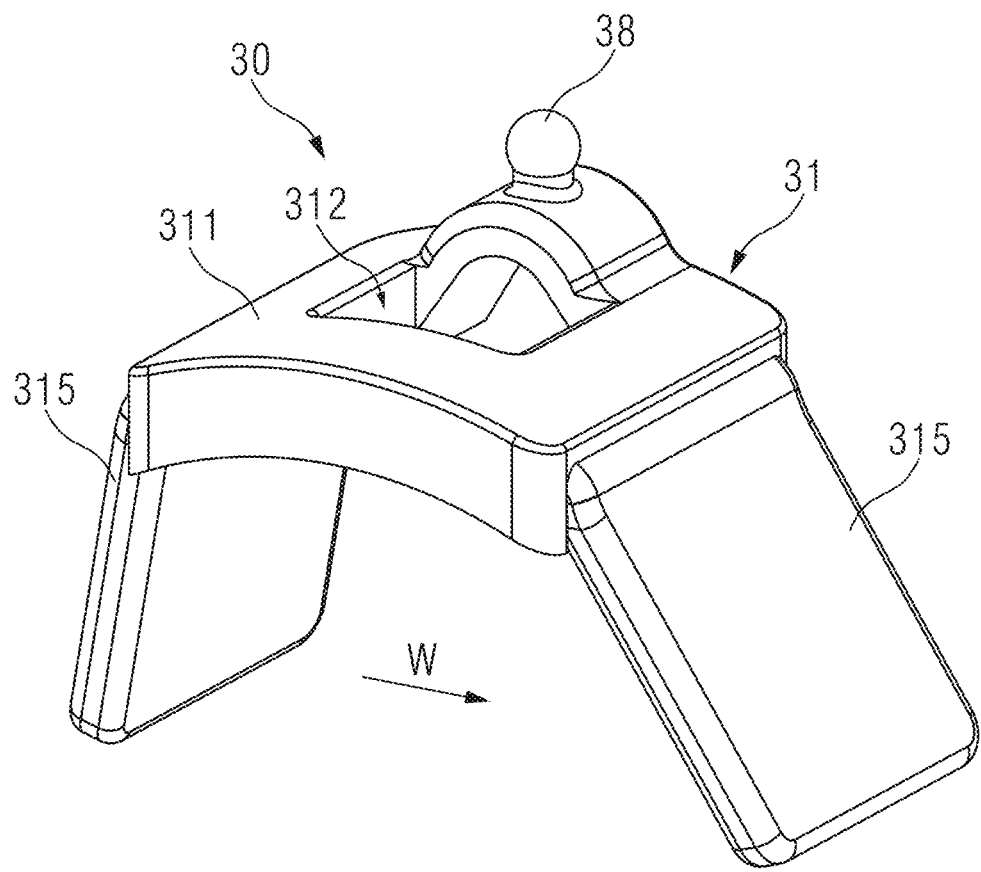
FIG. 9 shows a RF coil according to an exemplary embodiment of the disclosure.
Figure 10:
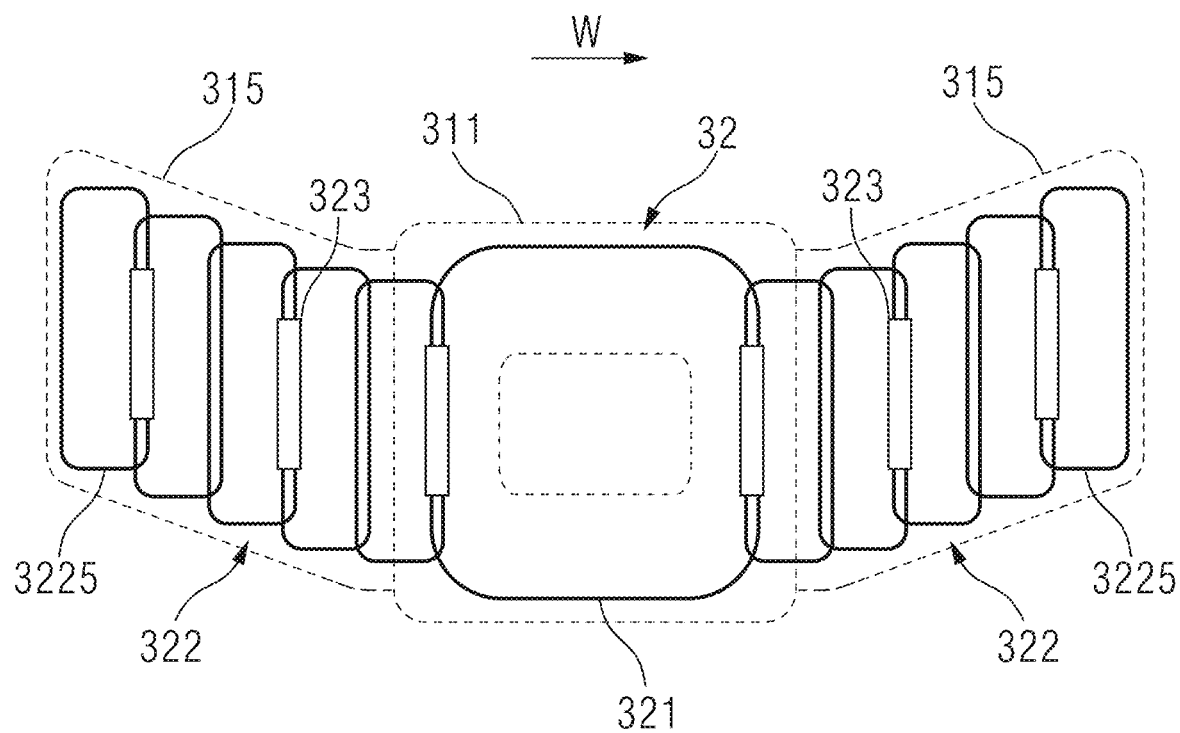
FIG. 10 shows the coil set of the RF coil shown in FIG. 9, according to an exemplary embodiment of the disclosure.

In other exemplary embodiments of the RF coil assembly, the RF coil may also be the RF coil shown in FIG. 9. Features of the RF coil shown in FIG. 9 which are the same or similar to features of the RF coil shown in FIG. 5 are not described again here; the features which differ therefrom are described below. FIG. 10 is a structural schematic drawing of the coil set of the 25 RF coil shown in FIG. 9. As shown in FIGS. 9 and 10, in the RF coil shown in FIG. 9, the coil set 32 is only provided with one central coil unit 321 and two lateral coil unit sets 322. The central coil unit 321 is disposed at the support part 311 and used to receive magnetic resonance signals from the mouth/nose side. As shown in FIG. 9, the support part 311 has a central vent hole 312 for mouth and nose ventilation. The central coil unit 321 is arranged around the central vent hole 312. The two lateral coil unit sets 322 are respectively arranged at two sides of the central coil unit 321 in the width direction W of the support part 311, and used to receive magnetic resonance signals from the two cheek sides respectively. Each lateral coil unit set 322 is arranged at one end of the support part 311 in the width direction W and the extension part 315 connected to this end. Each lateral coil unit set 322 comprises five side coil units 3225, arranged sequentially in such a way as to gradually move away from the central coil unit 321 (only one side coil unit of each lateral coil unit set is labelled schematically in the figure). In other exemplary embodiments, the number of side coil units 3225 may be adjusted as required; FIG. 11 shows schematically the case where each lateral coil unit set 322 comprises four side coil units 3225. The imaging quality for the oral cavity region can be improved by providing a central coil unit and lateral coil unit sets for the oral cavity structure. It will be understood that compared with providing a single central coil unit 321, providing two central coil units 321 at the mouth/nose side can help to improve the imaging quality.

In an exemplary embodiment, multiple side coil units 3225 of each lateral coil unit set 322 are arranged to correspond to a distribution region of teeth and a temporomandibular joint. Specifically, as shown in FIGS. 7, 8, 10 and 11, multiple side coil units 3225 of each lateral coil unit set 322 are offset upwards one by one, to adapt to the distribution trend of the teeth and temporomandibular joint which are gradually offset toward the crown side, thus helping to improve imaging quality for the teeth and temporomandibular joint.

As shown in FIGS. 7, 8, 10 and 11, in exemplary embodiments, adjacent parts of all adjacent pairs of the central coil unit 321 and side coil units 3225 of the coil set 32 are arranged to overlap, in order to achieve decoupling.

As shown in FIGS. 7, 8, 10 and 11, in exemplary embodiments, the coil set 32 further comprises multiple PCBs 323 (only two of these PCBs are labelled schematically in each figure). A tuning/detuning circuit of the central coil unit 321 and tuning/detuning circuits of the side coil units 3225 are arranged on the PCBs 323. This helps to increase circuit reliability.

As shown in FIG. 2, in an exemplary embodiment, the RF coil assembly further comprises a connecting plug 61, a low-noise amplifier assembly 62, and a connecting cable (not shown in FIG. 2) concealed within the coil support 10. The connecting plug 61 is disposed on the base 11. The low-noise amplifier assembly 62 is disposed in the base 11 and connected to the connecting plug 61. The low-noise amplifier assembly 62 comprises multiple low-noise amplifiers, and the connecting cable comprises multiple connecting lines. Each connecting line has one end connected to one low-noise amplifier, and another end connected to one central coil unit 321 or one side coil unit 3225 of the RF coil 30. The connecting cable passes sequentially through the base 11, the first adjusting arm 13 and the second adjusting arm 14. It is thus possible to avoid interference to the examination subject from an external cable, and the high degree of integration can facilitate use.

As shown in FIG. 1, in an exemplary embodiment, the base 11 has an accommodating recess 113 for accommodating the examination subject's head; this can help to stabilize the position and angle of the examination subject's head during examination.

As shown in FIGS. 1 and 2, in an exemplary embodiment, the base 11 also has two handle holes 114, to make it easier to move the RF coil assembly.

As shown in FIGS. 1 and 2, in an exemplary embodiment, the RF coil assembly further comprises three knobs 80, respectively fixed to the braking member 12, the first connecting shaft 15 and the second connecting shaft 16, to facilitate operation.

FIG. 12 is used to show a scenario of use of the RF coil assembly shown in FIG. 1. As shown in FIG. 12, during use, the head of the examination subject 90 is positioned in the accommodating recess 113 and located below the RF coil 30, the mouth of the examination subject 90 is opposite the first vent hole 313, and the nostrils of the examination subject 90 are opposite the second vent hole 314.

The present disclosure also provides an MRI system which, in an exemplary embodiment thereof, comprises the RF coil assembly shown in FIG. 1. In the RF coil assembly for the MRI system, the position and angle of the RF coil can be flexibly adjusted so that the RF coil fits the examination subject more closely, thus helping to increase imaging quality.

It should be understood that although the description herein is based on various embodiments, it is by no means the case that each embodiment contains just one independent technical solution. Such a method of presentation is adopted herein purely for the sake of clarity. Those skilled in the art should consider the description in its entirety. The technical solutions in the various embodiments could also be suitably combined to form other embodiments understandable to those skilled in the art.

The series of detailed explanations set out above are merely particular explanations of feasible embodiments of the present disclosure, which are not intended to limit the scope of protection thereof. All equivalent embodiments or changes made without departing from the artistic spirit of the present disclosure, such as combinations, divisions or repetitions of features, shall be included in the scope of protection of the present disclosure.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure.

Rather, the scope of the disclosure is defined only in accordance with the following claims and their equivalents.

Reference List 10 coil support
11 base
111 first shaft seat
112 second shaft seat
113 accommodating recess
114 handle hole
12 braking member
13 first adjusting arm
131 third shaft seat
132 fourth shaft seat
14 second adjusting arm
141 coil connecting part
15 first connecting shaft
151 first pressing part
152 first rotation shaft part
153 first abutment face 16 second connecting shaft
161 second pressing part
162 second rotation shaft part
163 second abutment face
30 RF coil
31 main body
311 support part
312 central vent hole
313 first vent hole
314 second vent hole
315 extension part
32 coil set
321 central coil unit
322 lateral coil unit set
3225 side coil unit
323 PCB
38 ball head
51 fixing belt
52 hook-and-loop fastener
61 connecting plug
62 low-noise amplifier assembly
80 knob
90 examination subject
L1 first axis
L2 second axis
L3 third axis
W width direction of support part

The invention claimed is:

1. A radio-frequency (RF) coil assembly for a magnetic resonance imaging (MRI) system, the RF coil assembly comprising:
a coil support, including:
a base,
a first adjusting arm, rotatably connected to the base and configured to be rotatable about a first axis relative to the base, and
a second adjusting arm, rotatably connected to the first adjusting arm and configured to be rotatable about a second axis relative to the first adjusting arm, the second axis being parallel to the first axis; and
an RF coil configured to receive magnetic resonance (MR) signals, and being rotatably connected to the second adjusting arm, the RF coil being configured to be rotatable about a third axis relative to the second adjusting arm, the third axis being parallel to the first axis,
wherein the first axis, the second axis, and the third axis are separate and spaced apart from one another, and
wherein the coil support further comprises:
a first connecting shaft, the base having a first shaft seat and a second shaft seat arranged opposite one another along the first axis, the first connecting shaft having a first pressing part and a first rotation shaft arranged consecutively along the first axis, the first pressing part being threadably connected to the first shaft seat around the first axis, the first rotation shaft being a cylinder with its axis coinciding with the first axis and having one end connected to the second shaft seat, the first adjusting arm being fitted around the first rotation shaft rotatably, and the first pressing part having a first abutment face facing the first adjusting arm, the first abutment face being able to press against the first adjusting arm in a direction parallel to the first axis and facing toward the second shaft seat to increase a rotation resistance of the first adjusting arm; or
a second connecting shaft, the first adjusting arm having a third shaft seat and a fourth shaft seat arranged opposite one another along the second axis, the second connecting shaft having a second pressing part and a second rotation shaft arranged consecutively along the second axis, the second pressing part being threadably connected to the third shaft seat around the second axis, the second rotation shaft being a cylinder with its axis coinciding with the second axis and having one end connected to the fourth shaft seat, the second adjusting arm being fitted round the second rotation shaft rotatably, and the second pressing part having a second abutment face facing the second adjusting arm, the second abutment face being able to press against the second adjusting arm in a direction parallel to the second axis and facing toward the fourth shaft seat to increase the rotation resistance of the second adjusting arm.

2. The RF coil assembly for an MRI system as claimed in claim 1, wherein the RF coil is rotatably connected to the second adjusting arm by a spherical pair.

3. The RF coil assembly for an MRI system as claimed in claim 2, wherein:
the RF coil has a ball head, and the second adjusting arm has a coil connector, the ball head being rotatably embedded in the coil connector to form the spherical pair with the coil connector; and
the coil support further comprises a brake threadably connected to the coil connector and configured to advance helically in an axial direction of a thread thereof until the brake presses against the ball head to increase a rotation resistance of the ball head.

4. The RF coil assembly for an MRI system as claimed in claim 1, wherein the coil support comprises the first connecting shaft and the second connecting shaft.

5. The RF coil assembly for an MRI system as claimed in claim 1, wherein the RF coil comprises:
a main body having a support and two extensions, the support being rotatably connected to the second adjusting arm, and the two extensions being respectively connected to two ends of the support in a width direction of the support; and
a coil set housed within the main body and disposed at the support and the two extensions, the coil set being configured to receive magnetic resonance signals.

6. The RF coil assembly for an MRI system as claimed in claim 5, wherein the RF coil assembly further comprises:
two soft fixing belts, each having one end connected to the base; and
two fasteners, the other end of each fixing belt being connected to one of the two extensions via one of the two fasteners, and relative positions of the fixing belt and the extension after connection being adjustable by the fastener.

7. The RF coil assembly for an MRI system as claimed in claim 6, wherein the two fasteners are hook-and-loop fasteners.

8. The RF coil assembly for an MRI system as claimed in claim 5, wherein the RF coil is configured to receive magnetic resonance signals emitted by tissue and/or organs in an oral cavity region of an examination subject, and the coil set including:
a central coil, disposed at the support and configured to receive magnetic resonance signals from a mouth/nose side, the support having a central vent hole configured for mouth and nose ventilation, and the central coil being arranged around the central vent hole; and two lateral coil sets, respectively disposed at two sides of the central coil in the width direction of the support and respectively configured to receive magnetic resonance signals from two cheek sides, each lateral coil set being disposed at one end of the support in the width direction and the extension connected to the one end of the support, and each lateral coil set including multiple side coils arranged sequentially so as to gradually move away from the central coil.

9. The RF coil assembly for an MRI system as claimed in claim 8, wherein the multiple side coils of each lateral coil set are arranged to correspond to a distribution region of teeth and a temporomandibular joint.

10. The RF coil assembly for an MRI system as claimed in claim 8, wherein adjacent parts of all adjacent pairs of the central coil and the side coils of the coil set are arranged to overlap.

11. The RF coil assembly for an MRI system as claimed in claim 8, wherein the coil set further comprises multiple printed circuit boards (PCBs), a tuning/detuning circuit of the central coil and tuning/detuning circuits of the side coils being disposed on the multiple PCBs.

12. The RF coil assembly for an MRI system as claimed in claim 5, wherein the RF coil is configured to receive magnetic resonance signals emitted by tissue and/or organs in an oral cavity region of an examination subject, and the coil set comprises:

two central coils, disposed at the support and configured to receive magnetic resonance signals from a mouth/nose side, the support having a first vent hole configured for mouth ventilation and a second vent hole configured for nose ventilation, wherein one of the central coils is arranged around the first vent hole, and the other central coil is arranged around the second vent hole; and two lateral coil sets, respectively disposed at two sides of the central coils in the width direction of the support and respectively configured to receive magnetic resonance signals from two cheek sides, each lateral coil set being disposed at one end of the support in the width direction and the extension connected to the one end of the support, and each lateral coil set including multiple side coils arranged sequentially in so as to gradually move away from the central coil.

13. The RF coil assembly for an MRI system as claimed in claim 12, wherein the multiple side coils of each lateral coil set are arranged to correspond to a distribution region of teeth and a temporomandibular joint.

14. The RF coil assembly for an MRI system as claimed in claim 12, wherein adjacent parts of all adjacent pairs of the central coil and the side coils of the coil set are arranged to overlap.

15. The RF coil assembly for an MRI system as claimed in claim 12, wherein the coil set further comprises multiple printed circuit boards (PCBs), a tuning/detuning circuit of the central coil and tuning/detuning circuits of the side coils being disposed on the multiple PCBs.

16. The RF coil assembly for an MRI system as claimed in claim 1, wherein the RF coil assembly further comprises:

a connecting plug, disposed on the base;

a low-noise amplifier assembly, disposed in the base and connected to the connecting plug; and a connecting cable, having one end connected to the low-noise amplifier assembly and another end connected to the RF coil, the connecting cable being housed in the coil support and sequentially passing through the base, the first adjusting arm, and the second adjusting arm.

17. A magnetic resonance imaging (MRI) system, comprising a radio-frequency (RF) coil assembly as claimed in claim 1.

18. A radio-frequency (RF) coil assembly for a magnetic resonance imaging (MRI) system, the RF coil assembly comprising:

a coil support, including:
a base,
a first adjusting arm, rotatably connected to the base and configured to be rotatable about a first axis relative to the base, and
a second adjusting arm, rotatably connected to the first adjusting arm and configured to be rotatable about a second axis relative to the first adjusting arm, the second axis being parallel to the first axis;

an RF coil configured to receive magnetic resonance (MR) signals, and being rotatably connected to the second adjusting arm, the RF coil being configured to be rotatable about a third axis relative to the second adjusting arm, the third axis being parallel to the first axis, wherein the first axis, the second axis, and the third axis are separate and spaced apart from one another, the RF coil comprising: (i) a main body having a support and two extensions, the support being rotatably connected to the second adjusting arm, and the two extensions being respectively connected to two ends of the support in a width direction of the support, and (ii) a coil set housed within the main body and disposed at the support and the two extensions, the coil set being configured to receive magnetic resonance signals;

two soft fixing belts, each having one end connected to the base; and two fasteners, the other end of each fixing belt being connected to one of the two extensions via one of the two fasteners, and relative positions of the fixing belt and the extension after connection being adjustable by the fastener.

19. A radio-frequency (RF) coil assembly for a magnetic resonance imaging (MRI) system, the RF coil assembly comprising:

a coil support, including:
a base,
a first adjusting arm, rotatably connected to the base and configured to be rotatable about a first axis relative to the base, and
a second adjusting arm, rotatably connected to the first adjusting arm and configured to be rotatable about a second axis relative to the first adjusting arm, the second axis being parallel to the first axis; and an RF coil configured to receive magnetic resonance (MR) signals, and being rotatably connected to the second adjusting arm, the RF coil being configured to be rotatable about a third axis relative to the second adjusting arm, the third axis being parallel to the first axis, wherein the first axis, the second axis, and the third axis are separate and spaced apart from one another, the RF coil comprising: (i) a main body having a support and two extensions, the support being rotatably connected to the second adjusting arm, and the two extensions being respectively connected to two ends of the support in a width direction of the support, and (ii) a coil set housed within the main body and disposed at the support and the two extensions, the coil set being configured to receive magnetic resonance signals, wherein the RF coil is configured to receive magnetic resonance signals emitted by tissue and/or organs in an oral cavity region of an examination subject, and the coil set comprises:

(i) a central coil, disposed at the support and configured to receive magnetic resonance signals from a mouth/nose side, the support having a central vent hole configured for mouth and nose ventilation, and the central coil being arranged around the central vent hole, and two lateral coil sets, respectively disposed at two sides of the central coil in the width direction of the support and respectively configured to receive magnetic resonance signals from two cheek sides, each lateral coil set being disposed at one end of the support in the width direction and the extension connected to the one end of the support, and each lateral coil set including multiple side coils arranged sequentially so as to gradually move away from the central coil; or (ii) two central coils, disposed at the support and configured to receive the magnetic resonance signals from the mouth/nose side, the support having a first vent hole configured for mouth ventilation and a second vent hole configured for nose ventilation, wherein one of the central coils is arranged around the first vent hole, and the other central coil is arranged around the second vent hole, and the two lateral coil sets, respectively disposed at the two sides of the central coils in the width direction of the support and respectively configured to receive magnetic resonance signals from the two cheek sides, each lateral coil set being disposed at the one end of the support in the width direction and the extension connected to the one end of the support, and each lateral coil set including the multiple side coils arranged sequentially in so as to gradually move away from the central coil.

* * * * *